June 25, 1946.  E. L. DIAL  2,402,877
ADJUSTABLE FLASHLIGHT HOLDER
Filed Jan. 5, 1945  2 Sheets-Sheet 1

INVENTOR.
Earl L. Dial

BY Victor J. Evans & Co.
ATTORNEYS

June 25, 1946.　　　　　E. L. DIAL　　　　　2,402,877
ADJUSTABLE FLASHLIGHT HOLDER
Filed Jan. 5, 1945　　　　2 Sheets-Sheet 2
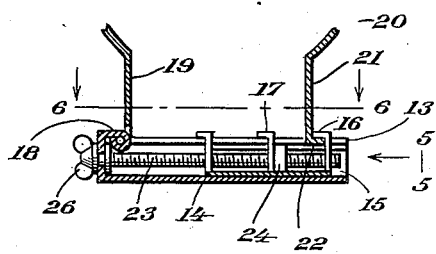
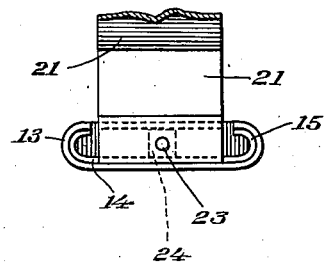
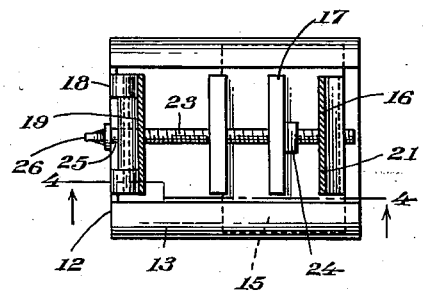
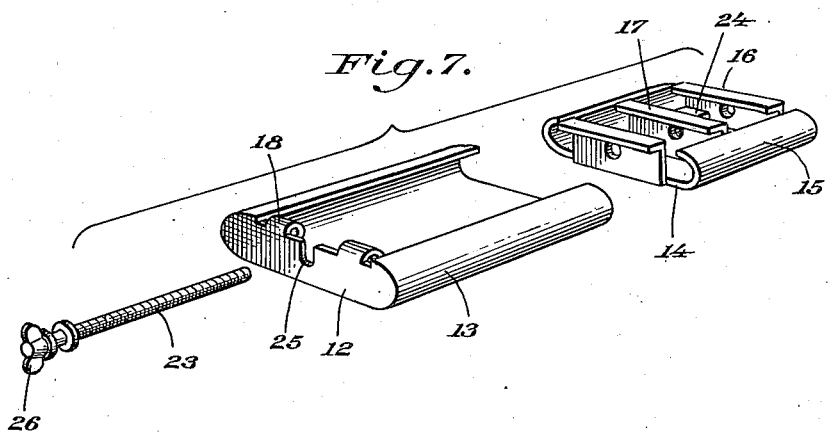
INVENTOR.
Earl L. Dial:
BY Victor J. Evans & Co.
ATTORNEYS Patented June 25, 1946

2,402,877

UNITED STATES PATENT OFFICE 2,402,877

ADJUSTABLE FLASHLIGHT HOLDER

Earl L. Dial, Kennewick, Wash.

Application January 5, 1945, Serial No. 571,479

5 Claims. (Cl. 24—263)

The invention relates to a holding bracket, and more especially to an adjustable flashlight holder.

The primary object of the invention is the provision of a device of this character, wherein a flashlight can be adjustably held upon the steering column or other selected place within a motor vehicle, and is susceptible for instant removal, at the will of the user thereof.

Another object of the invention is the provision of a device of this character, wherein it has a wide and extended range of adjustment, so that it may fit variable sizes of steering columns, the device being of novel construction, and can be readily and easily adjusted, and the medium retained thereby can be regulated to satisfy the directional throw of light from a flashlight when supported thereby.

A further object of the invention is the provision of a device of this character, wherein it can be attached at convenient points where repairs are required in an automobile, or the like, and also supports a flashlight so that the latter may be used as a driving light, in case of failure of the driving lights of the vehicle, the device being unique in its structural make-up, and is a handy supplement to such vehicle for emergency service.

A still further object of the invention is the provision of a device of this character, which is simple in construction, thoroughly reliable and efficient in operation, strong, durable, readily and easily applied and removed, conveniently adjusted with ease and dispatch, neat in appearance, handy for prompt service, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 4 is a sectional view taken on the line 4—4 of Figure 6 looking in the direction of the arrows.

Figure 5 is a fragmentary sectional view taken on the line 5—5 of Figure 4 looking in the direction of the arrows.

Figure 6 is a sectional view taken on the line 6—6 of Figure 4 looking in the direction of the arrows.

Figure 7 is an exploded perspective view of the structure shown in Figure 6.

Similar reference characters indicate corresponding parts throughout the several views in the drawings.

Figure 1:
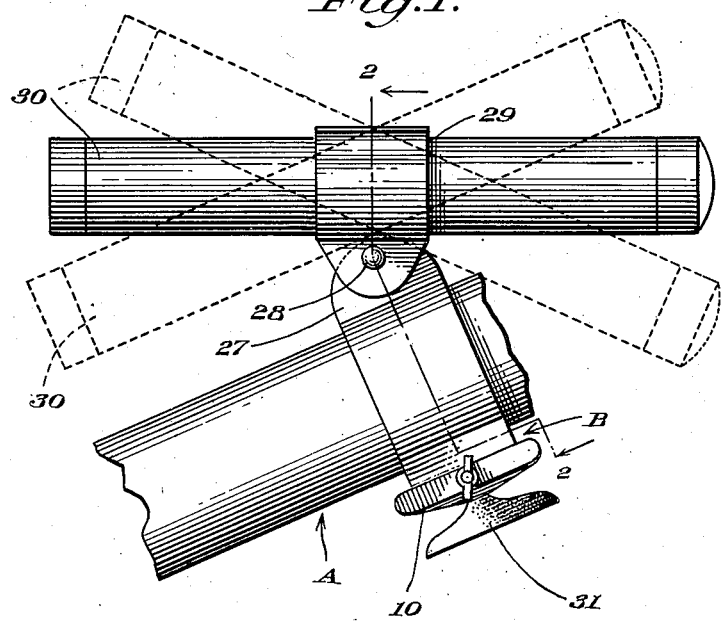
Figure 1 is a fragmentary perspective view of a motor vehicle steering column showing the device constructed in accordance with the invention applied thereto, one position of adjustment being shown by full lines and other positions of adjustment of the device shown by dotted lines.

Referring to the drawings in detail, A designates generally a portion of a steering column of a motor vehicle, which is of the ordinary well known construction and of conventional size, while B denotes in its entirety the holder constructed in accordance with the invention, and hereinafter set forth in detail.

The holder B comprises a main supporting base 10 having a solid bottom 11, an end closing wall 12, while opposite to the latter the other end is completely open, the bottom 11 being formed with side guide flanges 13 for a runner 14, which has at opposite sides the flanges 15 interfitting with the said flanges 13 for slidably interlocking therewith.

Figure 2:
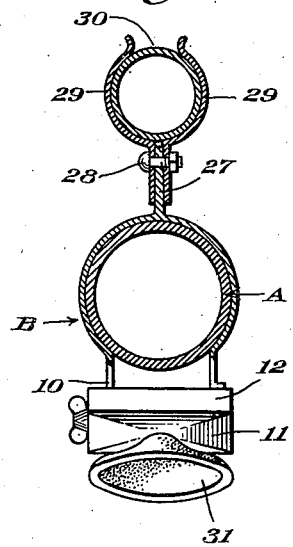
Figure 2 is a sectional view taken on the line 2—2 of Figure 1 looking in the direction of the arrows.
Figure 3:
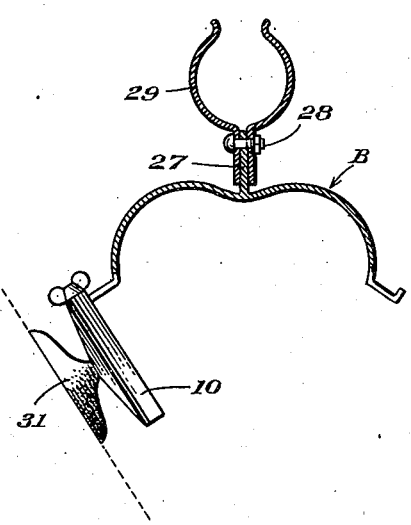
Figure 3 is a view similar to Figure 2 showing the device open and differently applied to a vehicle.

The runner 14 has spaced outer and intermediate hook-like jaws 16 and 17, respectively, which are exposed through the open top of the base 10, while pintal hinged at 18 to the end wall 12 of the latter is one arm 19 of a springy split clamping strap 20, with its other arm 21 thereof at its terminal keeper end 22 selectively and detachably engageable with the hook-like jaws 16 or 17, so as to embrace the column A or the like, as best shown in Figures 1 and 2 of the drawings.

The runner 14 is slidably adjusted by a feed screw 23, threaded in a nut 24 fixed to the jaw 17, and this screw 23 is detachably swiveled in a notched seat 25 in the wall 12 midway thereof, the outer workable end of the screw 23 being formed with a hand operated winged head 26. By actuating the screw 23 the clamping strap can be made firm and secure in place on the column or the like A.

At the closed medial portion of the strap 20 is a pivot ear 27, to which by a binding member 28 a springy clamping clip 29 is adjustably attached to such ear 27, the said clip being constructed to removably retain and hold a flashlight or other article 30 therein for any service that may be required by a motorist, thus making the device a handy gadget for a motor vehicle.

The base 10 has projecting slightly from its bottom 11 a suction cup 31 whereby the device may be conveniently attached and held upon a smooth surface for support thereon. The device is designed for variable conditions of service to a motorist, and is susceptible of adjustment and placement at different points on a motor vehicle, being usable for the service of the flashlight, as a trouble and driving light.

What is claimed is:

1. An adjustable flashlight holder, comprising a base having a solid bottom side guide flanges and one closing end wall formed on said bottom, a runner slidably interfitting the guide flanges and having a series of spaced jaws, a split springy embracing clamp having opposed opening and closing arms, a hinge connection between one arm and the end wall, and a hook shaped end on the other arm and selectively engageable with said jaws.

2. An adjustable flashlight holder, comprising a base having a solid bottom side guide flanges and one closing end wall formed on said bottom, a runner slidably interfitting the guide flanges and having a series of spaced jaws, a split springy embracing clamp having opposed opening and closing arms, a hinge connection between one arm and the end wall, a hook shaped end on the other arm and selectively engageable with said jaws, and a manually operated feed screw engaging the end wall and a nut on said runner for adjusting the runner.

3. An adjustable flashlight holder, comprising a base having a solid bottom side guide flanges and one closing end wall formed on said bottom, a runner slidably interfitting the guide flanges and having a series of spaced jaws, a split springy embracing clamp having opposed opening and closing arms, a hinge connection between one arm and the end wall, a hook shaped end on the other arm and selectively engageable with said jaws, a manually operated feed screw engaging the end wall and a nut on said runner for adjusting the runner, and an article receiving clip carried by the clamp.

4. An adjustable flashlight holder, comprising a base having a solid bottom side guide flanges and one closing end wall formed on said bottom, a runner slidably interfitting the guide flanges and having a series of spaced jaws, a split springy embracing clamp having opposed opening and closing arms, a hinge connection between one arm and the end wall, a hook shaped end on the other arm and selectively engageable with said jaws, a manually operated feed screw engaging the end wall and a nut on said runner for adjusting the runner, an article receiving clip carried by the clamp, and means adjustably connecting the clip and clamp together.

5. An adjustable flashlight holder, comprising a base having a solid bottom side guide flanges and one closing end wall formed on said bottom, a runner slidably interfitting the guide flanges and having a series of spaced jaws, a split springy embracing clamp having opposed opening and closing arms, a hinge connection between one arm and the end wall, a hook shaped end on the other arm and selectively engageable with said jaws, a manually operated feed screw engaging the end wall and a nut on said runner for adjusting the runner, an article receiving clip carried by the clamp, means adjustably connecting the clip and clamp together, and a suction cup carried by the base.

EARL L. DIAL.